(12) United States Patent
Deng et al.

(10) Patent No.: US 11,073,705 B2
(45) Date of Patent: Jul. 27, 2021

(54) INTEGRATED AND AUTOMATIC EYEGLASS TEMPLE ASSEMBLY DEVICE

(71) Applicant: DONGGUAN UNIVERSITY OF TECHNOLOGY, Dongguan (CN)

(72) Inventors: Jun Deng, Dongguan (CN); Chuliang He, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 128 days.

(21) Appl. No.: 16/440,887

(22) Filed: Jun. 13, 2019

(65) Prior Publication Data
US 2020/0004053 A1 Jan. 2, 2020

(30) Foreign Application Priority Data
Jun. 28, 2018 (CN) .......................... 2018106917101

(51) Int. Cl.
G02C 13/00 (2006.01)
B29D 12/02 (2006.01)
B23P 19/00 (2006.01)

(52) U.S. Cl.
CPC .................................. *G02C 13/001* (2013.01)

(58) Field of Classification Search
CPC ...... G02C 13/001; G02C 5/146; B29D 12/02; B23P 19/00; B23P 19/001; A61B 3/04; A61F 9/00; B21B 1/02; B21B 15/0035; B22D 23/04; B22D 19/08; B21C 23/22; B22F 7/00; B25B 23/045
See application file for complete search history.

(56) References Cited

U.S. PATENT DOCUMENTS

| | | | | | |
|---|---|---|---|---|---|
| 2,305,718 | A | * | 12/1942 | Lanman | G02C 13/001 408/126 |
| 3,605,241 | A | * | 9/1971 | Fish | G02C 5/12 156/73.5 |
| 5,097,600 | A | * | 3/1992 | Brule | G02C 13/001 269/156 |

(Continued)

*Primary Examiner* — Lawrence Averick
(74) *Attorney, Agent, or Firm* — Law Offices Office of Steven W. Weinrieb (57) ABSTRACT

The present invention discloses an integrated and automatic eyeglass temple assembly device, including a left table frame and a right table frame. The left table frame and the right table frame are respectively provided with a frame, and each upper end of the frame is provided with a hinge feeding tray. The left table frame and the right table frame are respectively provided with a temple box, a clamping mechanism and a single temple holding assembly. The mounting slot of the temple is located between the temple clamping pushing plate and the temple holding assembly, the movable slot is at the same level with the mounting portion of the hinge, and each temple box is provided with a temple feeding cylinders. The object of the present invention is to provide integrated and automatic eyeglass temple assembly device, in which two feeding trays are used for feeding hinges onto 2 working stations and by pushing and clamping hinges with the cylinders, hinge pushing boxes and hinge pressing plates, it is possible to achieve integrated and automatic temple assembly on both working stations and improve the working efficiency.

10 Claims, 5 Drawing Sheets

(56) References Cited

U.S. PATENT DOCUMENTS

| | | | |
|---|---|---|---|
| 5,838,417 A * | 11/1998 | Dahan | G02C 9/04 |
| | | | 351/42 |
| 10,618,235 B2 * | 4/2020 | Valmassoi | B26F 1/14 |
| 2017/0165933 A1 * | 6/2017 | Valmassoi | B23C 3/00 |

* cited by examiner

INTEGRATED AND AUTOMATIC EYEGLASS TEMPLE ASSEMBLY DEVICE

FIELD OF THE INVENTION

The present invention relates generally to the field of the assembling of eyeglasses, and more particularly to a double station automatic assembly for the temple components and hinges of the eyeglasses, and still more particularly, to an integrated and automatic eyeglass temple assembly device.

BACKGROUND OF THE INVENTION

Figure 8:
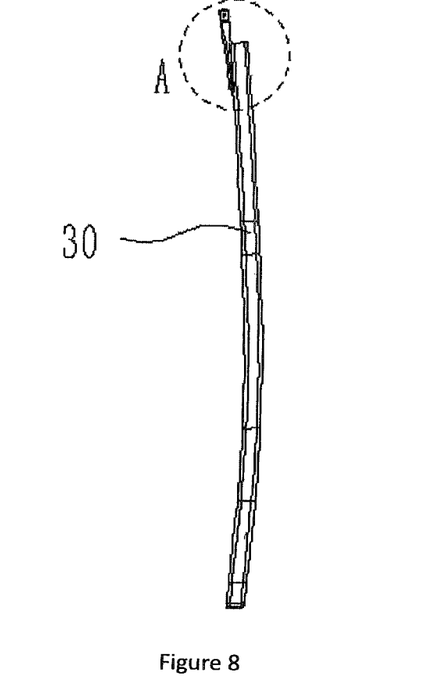
FIG. 8 is a schematic perspective view showing the assembled structure of the temple and the hinge.
Figure 9:
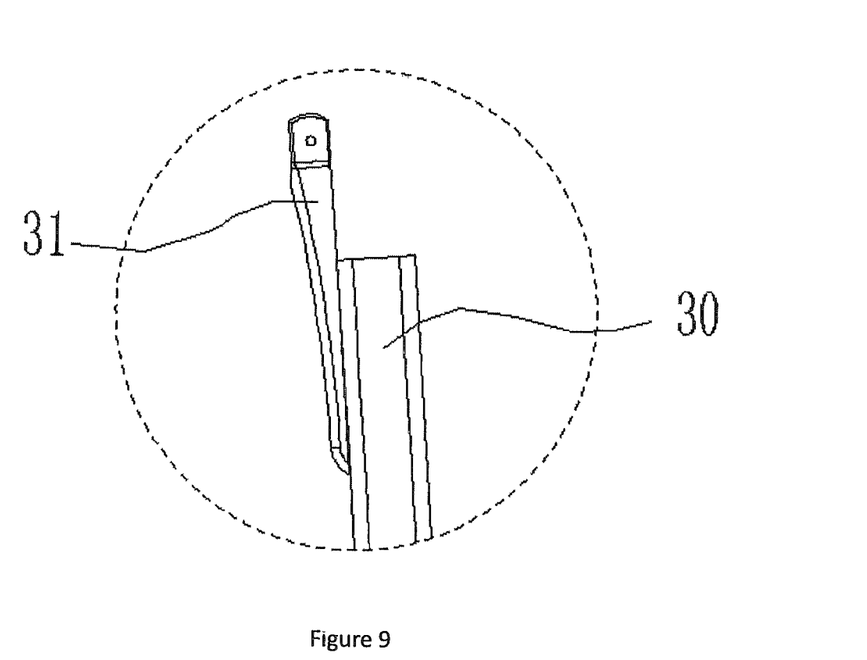
FIG. 9 is a partially enlarged schematic structural view of the portion A in FIG. 7.
Figure 10:
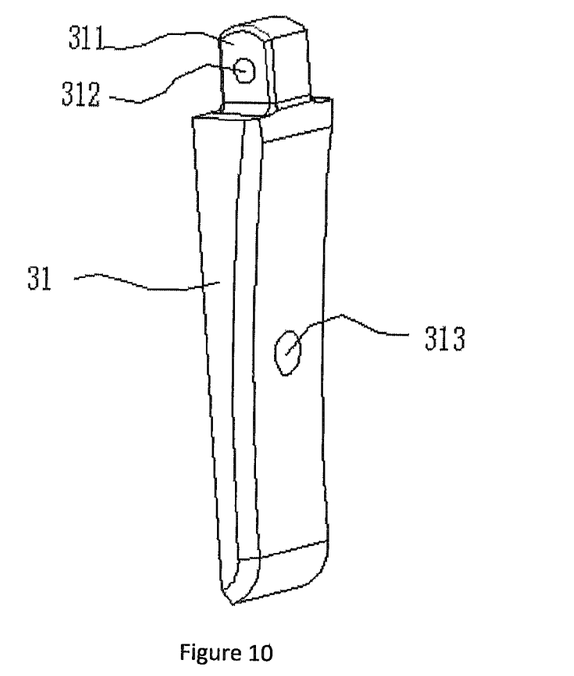
FIG. 10 is a schematic perspective view of the hinge.

With increasing living pressures and viewing demands, the number of people suffering from myopia is also increasing. Nearsighted eyeglasses are getting more and more popular as a tool for effectively suppressing diopters from rising and obtaining a clear vision. As shown in FIGS. 8-10, there is a pair of eyeglasses with a hinge 31 to connect the eyeglasses and temples 30 commercially available, with which it is possible to adjust eyeglass legs opening degree and prevent deformation thereof, to avoid the occurrence of eyeglasses being hung too close or loose to the temples and affect the wearing comfort.

As shown in FIGS. 8-10, the hinge 31 is formed by a hinge head 311, a pin bore 312 and a connection hole 313. When assembling the hinge 31 and the temple 30, it is necessary to attach the hinge 31 to the mounting slot of the temple 30, while aligning the connection hole 313 with the threaded hole of the temple 30, and then completing the assembly by screwing in the screw. The existing assembly methods are all carried out by means of human and machine cooperation, in this way, on one hand, it increases labor cost; on the other hand, the assembly efficiency is low. Moreover, by manual assembly the product is prone to assembly errors, and the screws are subject to loosening, consequently, product quality cannot be promised. In addition, with the existing assembly machine precise positioning and clamping of the temples 30 and the hinges 31 cannot be achieved, which results in a high scrap rate.

OVERALL OBJECTIVE OF THE INVENTION

The overall objective of the present invention is to provide integrated and automatic eyeglass temple assembly device addressing above problems. Two feeding trays are designed to feed hinges onto 2 working stations and by pushing and clamping hinges with the cylinder, hinge pushing box and hinge pressing plate, it is possible to achieve integrated and automatic temple assembly on both working stations and improve the working efficiency.

SUMMARY OF THE INVENTION

In order to achieve the above objective, the technical solution adopted by the present invention is:

An integrated and automatic eyeglass temple assembly device, includes a left table frame and a right table frame with foot mats; on the upper end of the left table frame and the right table frame are provided frames for feeding hinges, the upper ends of the frames are provided with two hinge feeding trays, and two guiding tubes are respectively fixed at the lower ends of the hinge feeding trays; each of the guiding tubes is hollow inside and is open at the top and bottom side, and the opening on the top side is connected to the outlet of the hinge feeding trays; support legs are respectively provided on both sides along the bottom panel of the frames, on the support legs are provided sliding seats, each sliding seat are provided with a hinge push box communicating with the discharge outlet of the guiding tube and a push assembly for driving the hinge push box to move forward; the left table frame and the right table frame below the frames are respectively provided with two temple boxes, and two clamping mechanisms for temple and a temple holding assembly; each of the clamping mechanism includes a temple clamping cylinder, and a temple clamping pushing plate is disposed on the push rod of the temple clamping cylinder; the temple holding assembly includes a fixed support seat provided on the frame, the fixed support seat is provided with a servo motor and a slide guide plate with openings at both ends; the slide guide plate is internally provided with a gear member, a rotation shaft of the servo motor extends into the slide guide plate and engages with the gear member; a first side pressing bar and a second side pressing bar are located at the upper and lower ends of the gear member, and are respectively engaging with the gear member; the first side pressing bar is provided with a first side pressing plate, the second side pressing bar is provided with a second side pressing plate; the mounting slot of the temple is located between the temple clamping pushing plate and the temple holding assembly, and the movable slot is at the same level with the mounting portion of the hinge; each temple box is provided with a temple feeding cylinder.

Further, the push assembly is formed by a fixing plate, hinge push cylinders, a mounting plate, a screw vibration feeding tray, a feeding channel and an electric screwdriver; the hinge push box is open on the right side, and is provided with a screw mounting hole on the left panel thereof, the axis of the electric screwdriver coincides with that of the screw mounting hole.

Further, the frame is provided with a sliding table, the sliding table is provided with a L-shaped sliding pushing plate, the sliding pushing plate is provided with a discharge opening for the discharging of the hinge; the guiding tube is provided with a discharging cylinder, which is used for driving the sliding pushing plate to displace transversely on the sliding table.

Further, the hinge push box is formed by a bottom plate, a rear plate and two side plates, the rear plate and the two side plates form a push frame with a slot at the lower end thereof; the bottom plate is L-shaped, and the lower bottom plate thereof matches the slot, the vertical part thereof and the rear plate are connected by the retracting spring.

Further, the bottom plate located at the discharge end is provided with a slip-proof layer.

Further, a hinge pressing plate is disposed in the pushing direction of each hinge push box, a spring is connected between the hinge pressing plate and the baffle plate, the baffle plate is provided on the frame.

Further, the end of the hinge pressing plate is provided with a rubber hinge pressing head, a clamping space for clamping the upper end of the hinge is formed between the hinge pressing head and the rear plate.

Further, the two temple boxes are respectively mounted on two connection blocks, the left table frame and the right table frame are respectively provided with adjusting nuts, the lower end of each adjusting nut is fixed with a screw, and the two connecting blocks are respectively connected with the screws by threads.

Further, the first side pressing plate and the second side pressing plate are located between the bottom plate and the pushing plate, both the first side pressing plate and the second side pressing plate are provided with rubber mats.

Further, the first side pressing plate and the second side pressing plate are both inclined, and the inclination direction thereof is respectively consistent with the inclination direction of the temples.

THE BENEFICIAL EFFECTS OF THE INVENTION

Two feeding trays are designed to feed hinges onto 2 working stations and by pushing and clamping hinges with the cylinders, hinge pushing boxes and hinge pressing plates, it is possible to achieve integrated and automatic temple assembly on both working stations and improve the working efficiency.

The integrated and automatic eyeglass temple assembly device realizes single material conveying by pushing the L-shaped sliding pushing plate, thereby ensuring subsequently continuous assembly of the hinges.

By pushing the mounting tray the limit push of hinges is realized with the bottom plate, the two side plates and the rear plate of the hinge push box. During continuous pushing, when the bottom plate hits the temple, the bottom plate will be kept in position by the retracting spring while the hinge is being pushed continuously with the two side plates and the rear plate to complete the assembly of the hinges. Pushing in this way ensures accurate positioning and pushing of the hinge position, while the bottom plate can also clamp the left side of the temple.

The hinge dropped from the guiding tube is prevented from slipping by the slip-proof layer.

The automatic process equipment of the present invention holds the temples assembled on the left and right sides in position by providing a temple holding assembly. When the hinge push box and the temple clamping cylinder are pushing, the bottom plate and the pushing plate form a firm clamping space with the first side pressing tray and the second side pressing plate.

Clamp the pushed temple, push the hinge to assemble them automatically together, eliminating the need for manual intervention, thereby ensuring high assembly efficiency.

The hinge pressing head prevents the hinge from tipping over, and when the hinge is pushed, the hinge pressing head and the rear plate realize the pressing and fixing of the hinge to prevent the hinge from moving, and ensure that the hinge is accurately positioned into the mounting slot.

The present invention can realize the adjustment of the height of the temple assembly by rotating the adjusting nuts.

The present invention adopts the automatic assembly, so that the whole assembly is faster and more convenient, which reduces the labor intensity of the workers and improves the work efficiency.

REFERENCE NUMBER KEY

The drawings include following integers:
1. Left table frame;
2. Frame;
3. Hinge feeding tray;
4. Baffle plate;
5. Spring;
6. Hinge pressing plate;
7. Hinge pressing head;
8. Guiding tube;
9. Sliding table;
10. Discharging cylinder;
11. Sliding pushing plate;
12. Discharge opening;
13. Support leg;
14. Slide seat;
15. Bottom plate;
16. Rear plate;
17. Side plate;
18. Retracting spring;
19. Fixing plate;
20. Hinge push cylinder;
21. Mounting plate;
22. Screw vibration feeding plate;
23. Feeding channel;
24. Electric screwdriver;
25. Temple box;
26. Temple clamping cylinder;
27. Pushing plate;
28. Temple holding assembly;
29. Temple feeding cylinder;
30. Temple;
31. Hinge;
32. Foot mat;
33. Adjusting nut;
34. Screw;
35. Connection block;
36. Right table frame;
151. Slip-proof layer;
161. Screw mounting hole;
201. Movable slot;
281. Fixed support seat;
282. Slide guide plate;
283. Rotation shaft;
284. Gear member;
285. First side pressing bar;
286. First side pressing plate;
287. Second side pressing bar;
288. Second side pressing plate;
289. Rubber mat;
311. Hinging head;
312. Pin bore;
313. Connection hole.

DETAILED DESCRIPTION OF THE ILLUSTRATED EMBODIMENT

The present invention will be described in detail below with reference to the accompanying drawings, the description below is only exemplary and explanatory, and should not be construed as limiting the scope of the present invention.

As shown in FIGS. 1-10, the specific structure of the present invention comprises a left table frame 1 and a right table frame 36 with foot mats 32; on the upper end of the left table frame 1 and the right table frame 36 are provided frames 2 for feeding hinges 31, the upper ends of the frames 2 are provided with two hinge feeding trays 3, and two guiding tubes 8 are respectively fixed at the lower ends of the hinge feeding trays 3; each of the guiding tubes 8 is hollow inside and is open at the top and bottom side, and the opening on the top side is connected to the outlet of the hinge feeding trays 3; support legs 13 are respectively provided on both sides along the bottom panel of the frames 2, on the support legs 13 are provided sliding seats 14, each sliding seat 14 are provided with a hinge push box communicating with the discharge outlet of the guiding tube 8 and a push assembly for driving the hinge push box to move forward; the left table frame 1 and the right table frame 36 below the frames 2 are respectively provided with two temple boxes 25, and two clamping mechanisms for temple 30 and a temple holding assembly 28; each of the clamping mechanism includes a temple clamping cylinder 26, and a temple clamping pushing plate 27 is disposed on the push rod of the temple clamping cylinder 26; the temple holding assembly 28 includes a fixed support seat 281 provided on the frame 2, the fixed support seat 281 is provided with a servo motor and a slide guide plate 282 with openings at both ends; the slide guide plate 282 is internally provided with a gear member 284, a rotation shaft 283 of the servo motor extends into the slide guide plate 282 and engages with the gear member 284; a first side pressing bar 285 and a second side pressing bar 287 are located at the upper and lower ends of the gear member 284, and are respectively engaging with the gear member 284; the first side pressing bar 285 is provided with a first side pressing plate 286, the second side pressing bar 285 is provided with a second side pressing plate 288; the mounting slot of the temple 30 is located between the temple clamping pushing plate 27 and the temple holding assembly 28, and the movable slot 201 is at the same level with the mounting portion of the hinge 31; each temple box 25 is provided with a temple feeding cylinder 29.

Preferably, the push assembly is formed by a fixing plate 19, hinge push cylinders 20, a mounting plate 21, a screw vibration feeding tray 22, a feeding channel 23 and an electric screwdriver 24; the hinge push box is open on the right side, and is provided with a screw mounting hole 161 on the left panel thereof, the axis of the electric screwdriver 24 coincides with that of the screw mounting hole 161.

Preferably, the frame 2 is provided with a sliding table 9, the sliding table 9 is provided with a L-shaped sliding pushing plate 11, the sliding pushing plate 11 is provided with a discharge opening 12 for the discharging of the hinge 31; the guiding tube 8 is provided with a discharging cylinder 10, which is used for driving the sliding pushing plate 11 to displace transversely on the sliding table 9.

Figure 4:
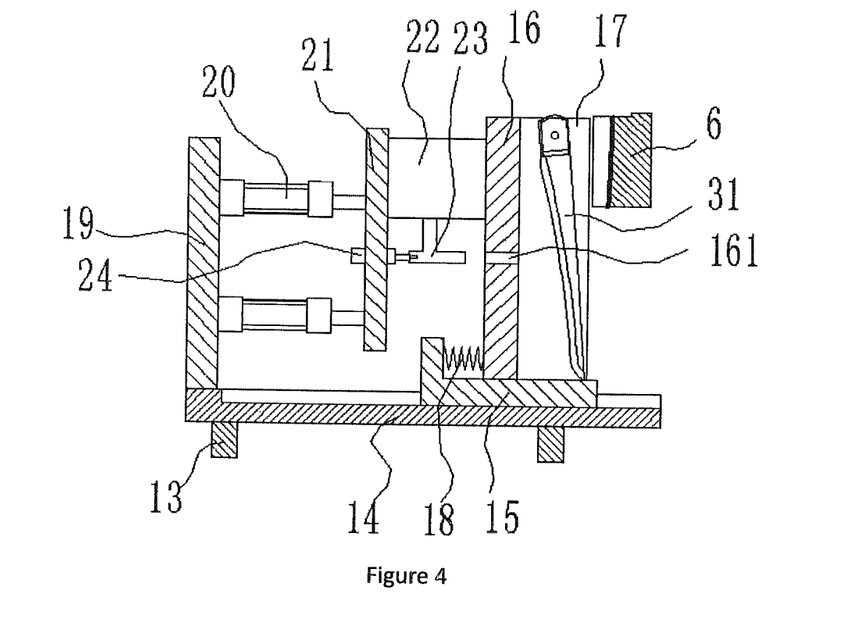
FIG. 4 is a schematic structural view of the hinge push box.
Figure 5:
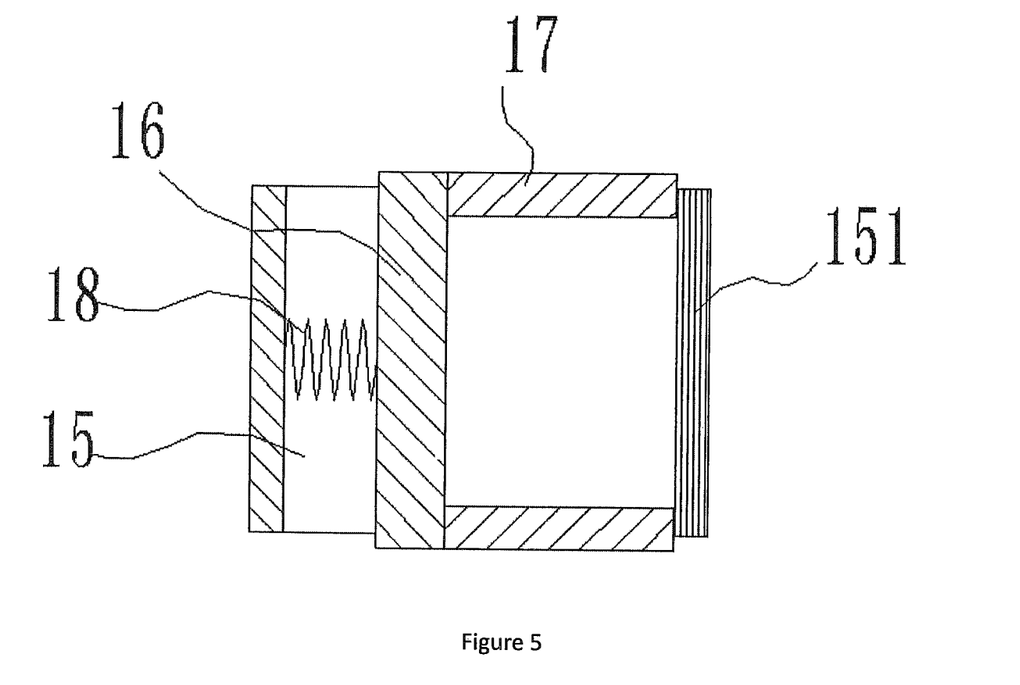
FIG. 5 is a schematic top plan view of the hinge push box.
Figure 6:
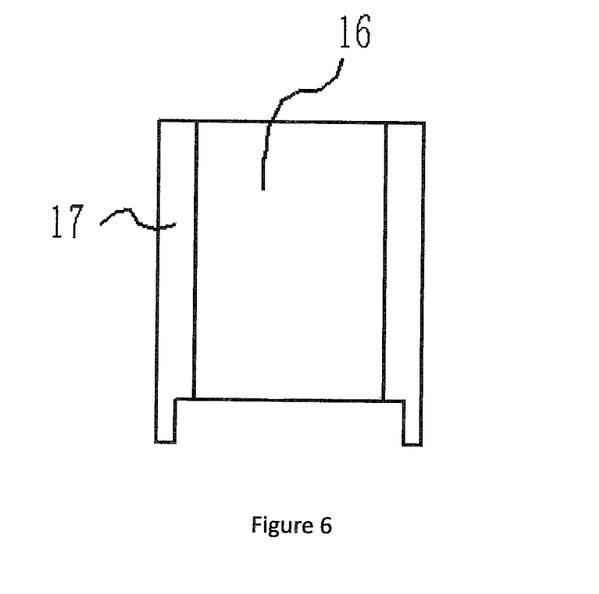
FIG. 6 is a schematic right side view of the rear plate and the side plates.

Preferably, the hinge push box is formed by a bottom plate 15, a rear plate 16 and two side plates 17, the rear plate 16 and the two side plates 17 form a push frame with a slot at the lower end thereof; the bottom plate 15 is L-shaped, and the lower bottom plate thereof matches the slot, the vertical part thereof and the rear plate 16 are connected by the retracting spring 18.

Preferably, the bottom plate 15 located at the discharge end is provided with a slip-proof layer 151.

Figure 3:
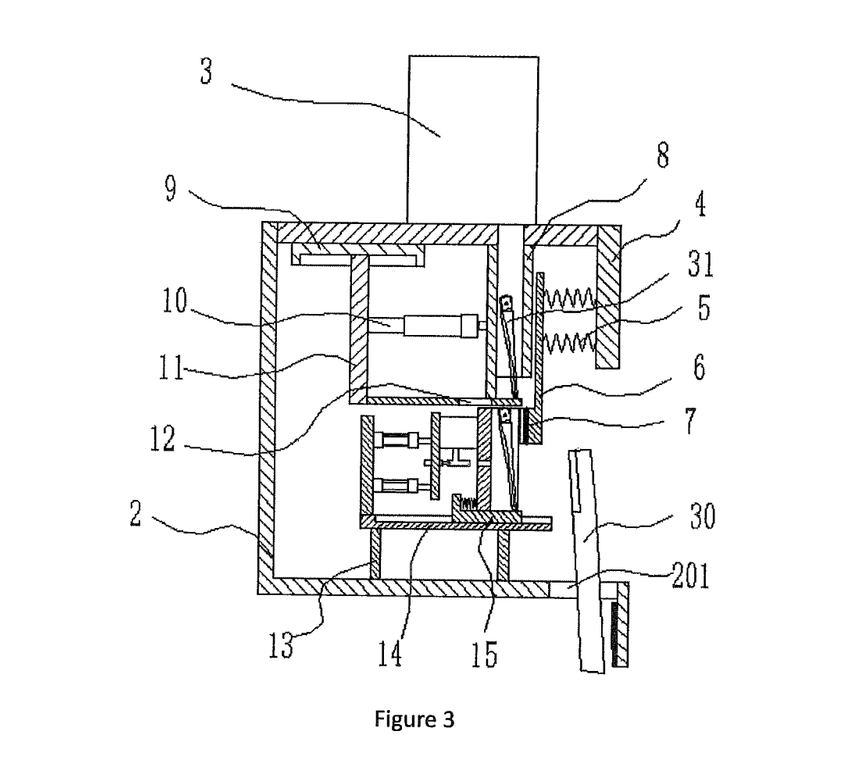
FIG. 3 is a schematic structural view of the hinge clamping and pushing.

Preferably, a hinge pressing plate 6 is disposed in the pushing direction of each hinge push box, a spring 5 is connected between the hinge pressing plate 6 and the baffle plate 4, the baffle plate 4 is provided on the frame 2.

Preferably, the end of the hinge pressing plate 6 is provided with a rubber hinge pressing head 7, a clamping, space for clamping the upper end of the hinge 31 is formed between the hinge pressing head 7 and the rear plate 16.

Figure 7:
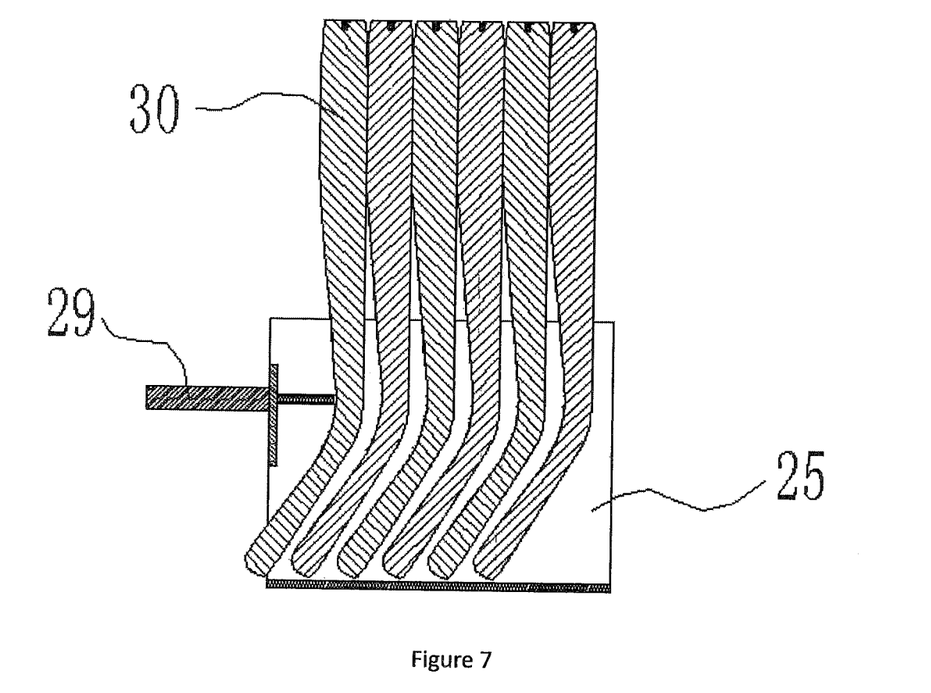
FIG. 7 is a schematic structural view of the temple box.

Preferably, the two temple boxes 25 are respectively mounted on two connection blocks 35, the left table frame 1 and the right table frame 36 are respectively provided with adjusting nuts 33, the lower end of each adjusting nut 33 is fixed with a screw 34, and the two connecting blocks 35 are respectively connected with the screws 34 by threads.

Figure 1:
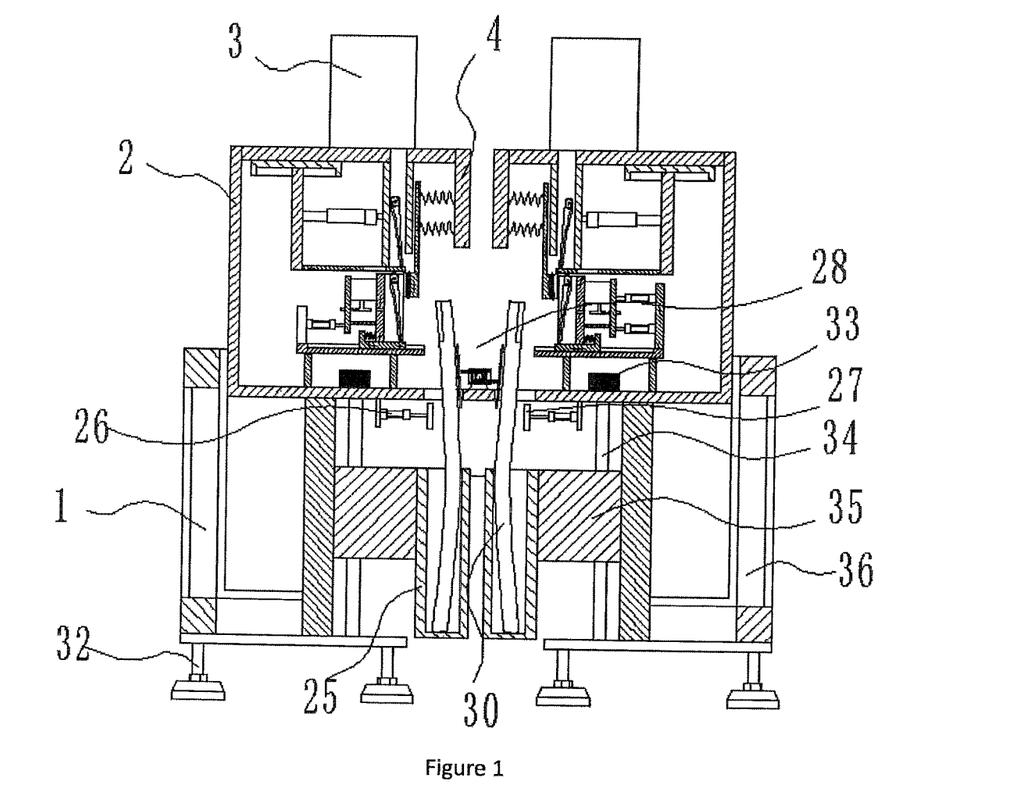
FIG. 1 is a schematic structural view of the present invention.
Figure 2:
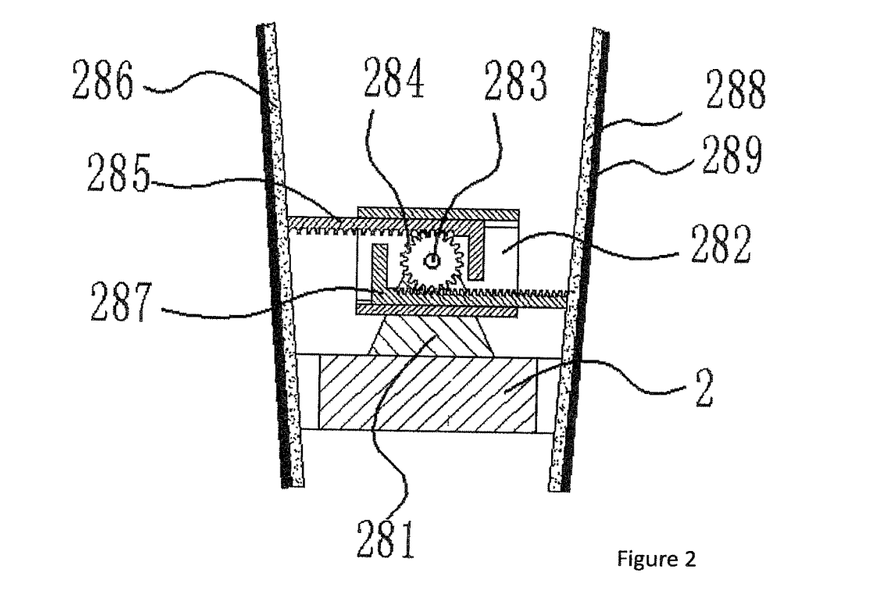
FIG. 2 is a partially enlarged schematic structural view showing the temple holding assembly.

Preferably, the first side pressing plate 286 and the second side pressing plate 288 are located between the bottom plate 15 and the pushing plate 27, both the first side pressing plate 286 and the second side pressing plate 288 are provided with rubber mats 289.

Preferably, the first side pressing plate 286 and the second side pressing plate 288 are both inclined, and the inclination direction thereof is respectively consistent with the inclination direction of the temples 30.

The specific assembly process of the present invention is as follows:

The hinge feeding trays 3 keep discharging, and the L-shaped sliding pushing plates 11 retains the hinges 31 in the guiding tubes 8. When the hinge push boxes return to initial position, the discharging cylinders 10 are activated, and the L-shaped sliding pushing plates 11 move on the sliding table 9. The hinges 31 drop from the discharge openings 12 into the hinge push boxes, and at this time push the discharging cylinders 10, store new hinges in the guiding tubes 8; and the hinge push cylinders 20 push the hinge push boxes to move on the slide plates 14. When pushing, the hinges 31 are fixed by the right hinge pressing heads 7 and the rear plates 16 from front and rear sides, and the two side plates 17 limit the hinges 31 in left and right orientation. The hinge pressing heads 7 are moved backward until the hinges 31 are engaged with the mounting slots of the temples 30. During the pushing forward process, the hinges 31 on the bottom plates 15 cannot enter the mounting slot, therefore the bottom plates 15 is designed to be a separated structure from the rear plates 16 and the side plates 17 in a slidable manner. During continuous pushing, when the bottom plates 15 hit the temples 30, the bottom plates 15 are held in position by the retracting springs 18, and the side plates 17 and the rear plates 16 continue to push forward to complete the push of the hinges 31.

The clamping of the temples 30 is performed by starting the servo motors, the rotation shafts 283 drive the gear members 284 to rotate, push the first side pressing plates 286 and the second side pressing plates 288 to move toward each other, and in cooperation with the bottom plates 15 and the pushing plates 27, clamping of the temple 30 can be achieved.

The electric screwdrivers 24 push the dropped screws into the connection holes 313 and tighten them after perfect fitting of each pair of hinge and temple, thereby realizing fully automated processing and assembly, reducing the labor intensity of the workers and improving the production efficiency.

It should be noted that in the present invention, the terms "including", "includes", or any other variant thereof are intended to encompass a non-exclusive inclusion, such that a process, method, article, or device including a plurality of elements not only includes those elements, but also includes other elements that are not explicitly listed, or elements that are inherent to such a process, method, item, or device.

The principles and embodiments of the present invention have been described herein with reference to specific examples, and the description of the above examples is only to assist in understanding the method of the present invention and core idea thereof. The above description is only a preferred embodiment of the present invention, it should be noted that due to the limited expression of words, there is an infinite concrete structure objectively. It will be apparent to those skilled in the art that a number of modifications, modifications, or variations may be made without departing from the principles of the invention, and the technical features described above may be combined in an appropriate manner. The present invention may be applied to other applications directly or in combination without modification, which should be considered as the scope of protection of the present invention.

What is claimed is:

1. An integrated and automatic eyeglass temple assembly device, wherein it includes a left table frame (1) and a right table frame (36) with foot mats (32); on the upper end of the left table frame (1) and the right table frame (36) are provided frames (2) for feeding hinges (31), the upper ends of the frames (2) are provided with two hinge feeding trays (3), and two guiding tubes (8) are respectively fixed at the lower ends of the hinge feeding trays (3); each of the guiding tubes (8) is hollow inside and is open at the top and bottom side, and the opening on the top side is connected to the outlet of the hinge feeding trays (3); support legs (13) are respectively provided on both sides along the bottom panel of the frames (2), on the support legs (13) are provided sliding seats (14), each sliding seat (14) are provided with a hinge push box communicating with the discharge outlet of the guiding tube (8) and a push assembly for driving the hinge push box to move forward; the left table frame (1) and the right table frame (36) below the frames (2) are respectively provided with two temple boxes (25), and two clamping mechanisms for temple (30) and a temple holding assembly (28); each of the clamping mechanism includes a temple clamping cylinder (26), and a temple clamping pushing plate (27) is disposed on the push rod of the temple clamping cylinder (26); the temple holding assembly (28) includes a fixed support seat (281) provided on the frame (2), the fixed support seat (281) is provided with a servo motor and a slide guide plate (282) with openings at both ends; the slide guide plate (282) is internally provided with a gear member (284), a rotation shaft (283) of the servo motor extends into the slide guide plate (282) and engages with the gear member (284); a first side pressing bar (285) and a second side pressing bar (287) are located at the upper and lower ends of the gear member (284), and are respectively engaging with the gear member (284); the first side pressing bar (285) is provided with a first side pressing plate (286), the second side pressing bar (285) is provided with a second side pressing plate (288); the mounting slot of the temple (30) is located between the temple clamping pushing plate (27) and the temple holding assembly (28), and the movable slot (201) is at the same level with the mounting portion of the hinge (31); each temple box (25) is provided with a temple feeding cylinder (29).

2. The integrated and automatic eyeglass temple assembly device of claim 1, wherein the push assembly is formed by a fixing plate (19), hinge push cylinders (20), a mounting plate (21), a screw vibration feeding tray (22), a feeding channel (23) and an electric screwdriver (24); the hinge push box is open on the right side, and is provided with a screw mounting hole (161) on the left panel thereof, the axis of the electric screwdriver (24) coincides with that of the screw mounting hole (161).

3. The integrated and automatic eyeglass temple assembly device of claim 2, wherein the frame (2) is provided with a sliding table (9), the sliding table (9) is provided with a L-shaped sliding pushing plate (11), the sliding pushing plate (11) is provided with a discharge opening (12) for the discharging of the hinge (31); the guiding tube (8) is provided with a discharging cylinder (10), which is used for driving the sliding pushing plate (11) to displace transversely on the sliding table (9).

4. The integrated and automatic eyeglass temple assembly device of claim 2, wherein the hinge push box is formed by a bottom plate (15), a rear plate (16) and two side plates (17), the rear plate (16) and the two side plates (17) form a push frame with a slot at the lower end thereof; the bottom plate (15) is L-shaped, and the lower bottom plate thereof matches the slot, the vertical part thereof and the rear plate (16) are connected by the retracting spring (18).

5. The integrated and automatic eyeglass temple assembly device of claim 4, wherein the bottom plate (15) located at the discharge end is provided with a slip-proof layer (151).

6. The integrated and automatic eyeglass temple assembly device of claim 1, wherein a hinge pressing plate (6) is disposed in the pushing direction of each hinge push box, a spring (5) is connected between the hinge pressing plate (6) and the baffle plate (4), the baffle plate (4) is provided on the frame (2).

7. The integrated and automatic eyeglass temple assembly device of claim 6, wherein the end of the hinge pressing plate (6) is provided with a rubber hinge pressing head (7), a clamping space for clamping the upper end of the hinge (31) is formed between the hinge pressing head (7) and the rear plate (16).

8. The integrated and automatic eyeglass temple assembly device of claim 1, wherein the two temple boxes (25) are respectively mounted on two connection blocks (35), the left table frame (1) and the right table frame (36) are respectively provided with adjusting nuts (33), the lower end of each adjusting nut (33) is fixed with a screw (34), and the two connecting blocks (35) are respectively connected with the screws (34) by threads.

9. The integrated and automatic eyeglass temple assembly device of claim 4, wherein the first side pressing plate (286) and the second side pressing plate (288) are located between the bottom plate (15) and the pushing plate (27), both the first side pressing plate (286) and the second side pressing plate (288) are provided with rubber mats (289).

10. The integrated and automatic eyeglass temple assembly device of claim 1,
   wherein the first side pressing plate (286) and the second side pressing plate (288) are both inclined, and
   the inclination direction thereof is respectively consistent with the inclination direction of the temples (30).

* * * * *